(12) United States Patent
Zhou et al.

(10) Patent No.: US 8,239,404 B2
(45) Date of Patent: Aug. 7, 2012

(54) IDENTIFYING ENTRIES AND EXITS OF STRONGLY CONNECTED COMPONENTS

(75) Inventors: Shukang Zhou, Redmond, WA (US); Ten H. Tzen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 209 days.

(21) Appl. No.: 12/797,627

(22) Filed: Jun. 10, 2010

(65) Prior Publication Data
US 2011/0307507 A1 Dec. 15, 2011

(51) Int. Cl.
G06F 17/30 (2006.01)
G06F 9/45 (2006.01)

(52) U.S. Cl. .................... 707/769; 707/798; 717/151

(58) Field of Classification Search .................. 707/769, 707/797, 798, 999.1, 999.101; 717/120, 717/124, 140, 151
See application file for complete search history.

(56) References Cited

U.S. PATENT DOCUMENTS

| 5,684,807 | A * | 11/1997 | Bianchini et al. | 714/712 |
| 5,978,588 | A * | 11/1999 | Wallace | 717/159 |
| 7,076,483 | B2 * | 7/2006 | Preda et al. | 1/1 |
| 7,263,532 | B2 * | 8/2007 | Steensgaard et al. | 1/1 |
| 7,614,037 | B2 | 11/2009 | Gavrilov | |
| 2008/0282237 | A1 | 11/2008 | Dai et al. | |

OTHER PUBLICATIONS

Tarjan's strongly connected components algorithm, Wikipedia.*
Coppersmith, et al., "A Divide-and-conquer Algorithm for Identifying Strongly Connected Components", Retrieved at <<http://www.osti.gov/bridge/servlets/purl/889876-HyvUva/889876.pdf>>, Technical Report, RC23744, Oct. 7, 2005, pp. 10.
Schudy, Warren., "Finding Strongly Connected Components in Parallel using O(log2 n) Reachability Queries", Retrieved at <<http://citeseerx.ist.psu.edu/viewdoc/download?doi=10.1.1.90.9892&rep=rep1&type=pdf>>, Oct. 6, 2007, pp. 12.
Xie, et al., "Implicit Enumeration of Strongly Connected Components and an Application to Formal Verification", Retrieved at <<http://ieeexplore.ieee.org/stamp/stamp.jsp?tp=&arnumber=875347 >>, IEEE Transactions on Computer-Aided Design of Integrated Circuits and Systems, vol. 19, No. 10, Oct. 2000, pp. 1225-1230.
Bloem, et al., "An Algorithm for Strongly Connected Component Analysis in n log n Symbolic Steps", Retrieved at <<http://citeseerx.ist.psu.edu/viewdoc/download;jsessionid=5C7D50EB21A1B74D9015D655FC1D7088?doi=10.1.1.31.302&rep=rep1&type=pdf>>, Formal Methods in System Design, vol. 28, No. 1, Jan. 2006, pp. 37-56.
McLendon, et al., "Finding Strongly Connected Components in Distributed Graphs", Retrieved at <<http://74.125.155.132/scholar?q=cache:jTWDJ3Mlc6MJ:scholar.google.com/++%22strongly+connected+components%22++%2B+recurssion+detection&hl=en&as_sdt=2000>>, Journal of Parallel and Distributed Computing, vol. 65, No. 8, Aug. 2005, pp. 11.

* cited by examiner

*Primary Examiner* — Hung T Vy
(74) *Attorney, Agent, or Firm* — Boswell IP Law; J. Mason Boswell

(57) ABSTRACT

A graph traversal system is described herein that efficiently identifies strongly connected components with entries, exits, and corresponding edges at the same time. Entry and exit nodes can be recognized by scanning every node after the strongly connected components have been identified, but revisiting these nodes incurs undesirable overhead. The graph traversal system identifies entries and exits during a single pass while the strongly connected components are being identified. In addition, the system modifies the semantics for some applications so that a single node all alone is not considered to be a strongly connected component. Thus, the graph traversal system allows efficient identification of entries to and exits from strongly connected components in a manner that can be applied to a variety of computer software problems that use directed graphs for data structures.

11 Claims, 4 Drawing Sheets

IDENTIFYING ENTRIES AND EXITS OF STRONGLY CONNECTED COMPONENTS

BACKGROUND

Directed graphs are used for modeling and solving a number of problems in computer software. For example, compilers often create call graphs where each node in a directed graph represents a function, and each connection represents a path through which one function calls another. Directed graphs (and in particular directed acyclic graphs) are often used for Bayesian networks for making decisions under uncertain conditions using a variety of known probabilities.

Strongly connected components (SCCs) in a directed graph are those sub-graphs that are maximally strongly connected. A graph or sub-graph is strongly connected if there is a path from each node in the graph to each other node. The paths flow in both directions, meaning that for two nodes to be part of a strongly connected graph, there has to be a path to get between the two nodes in each direction. Identifying strongly connected components in a directed graph is useful in many graph-based data structures, and several efficient algorithms have been developed, such as Tarjan's Algorithm. Tarjan's Algorithm performs a depth-first search from a start node. Nodes are placed on a stack as they are encountered. Each time the search returns from a sub-tree, a test is performed on the sub-tree node to determine whether the nodes below the sub-tree node form a strongly connected graph. If so, then those nodes are removed from the tree and identified as a strongly connected component.

Finding the entries and exits of strongly connected components is valuable in a number of applications. For example, a compiler may produce different code if a developer adds a call from one function to another that introduces recursion in a software application. The newly introduced edge in a directed graph holding the functions of the software application produces a different traversal order when identifying recursion edges and may cause a previously non-recursive edge to be identified as a recursive edge. Many compilers do not inline functions across a recursive edge, so what seemed to the developer to be a small change might reduce inlining and dramatically impact the size and execution time of the binary code for the software application. A node is an entry if there is an edge from some node outside of a strongly connected component to the original node; and a node is an exit if there is an edge from the node to some node outside of the strongly connected component. Using current technology, identifying entries and exits is inefficient and typically involves a second search through the tree after the strongly connected components have been identified. When used in a compiler on software code with many functions, this can dramatically increase compile time and resource usage.

SUMMARY

A graph traversal system is described herein that efficiently identifies strongly connected components with entries, exits, and corresponding edges at the same time. Entry and exit nodes can be recognized by scanning every node after the strongly connected components have been identified, but revisiting these nodes incurs undesirable overhead. The graph traversal system identifies entries and exits during a single pass while the strongly connected components are being identified. In addition, the system modifies the semantics for some applications so that a single node all alone is not considered a strongly connected component. By efficiently determining entries and exists while identifying strongly connected components, the system reduces time. Thus, the graph traversal system allows efficient identification of entries to and exits from strongly connected components in a manner that can be applied to a variety of computer software problems that use directed graphs for data structures.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
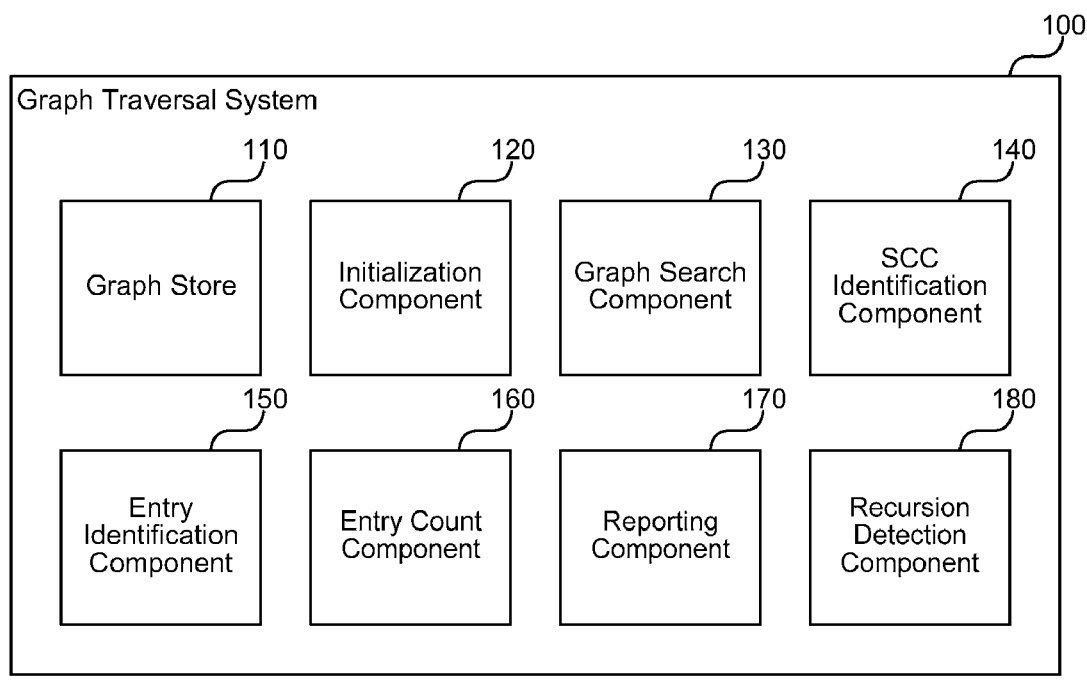
FIG. 1 is a block diagram that illustrates components of the graph traversal system, in one embodiment.

A graph traversal system is described herein that efficiently identifies strongly connected components with entries, exits, and corresponding edges at the same time. Existing techniques do not identify entries and exits when identifying strongly connected components. Entry and exit nodes can be recognized by scanning every node after the strongly connected components have been identified, but revisiting these nodes incurs undesirable overhead. The graph traversal system identifies entries and exits during a single pass while the strongly connected components are being identified. In addition, the system modifies the semantics for some applications so that a single node all alone is not considered a strongly connected component. When used in a compiler, the graph traversal system uses a node with the most entries for consistent identification of recursive edges. Doing so stabilizes code generation across small changes, so that minor changes by a developer do not reduce inlining or produce dramatically different generated binary code. By efficiently determining entries and exists while identifying strongly connected components, the system reduces compile time. In some embodiments, the system implements a modified version of Tarjan's Algorithm so that while strongly connected components are being detected, the entry/exit nodes and edges are identified as well. Naïve strongly connected components comprising a single node will not be recognized unless they form a self-cycle. The modified version is as efficient as Tarjan's algorithm in terms of time complexity. Thus, the graph traversal system allows efficient identification of entries to and exits from strongly connected components in a manner that can be applied to a variety of computer software problems that use directed graphs for data structures.

In a depth-first search over a graph, Tarjan's algorithm maintains two indices for each node: Index and LowLink. The Index specifies the order in which the node was reached, and the LowLink specifies the Index of the lowest Index node that can be reached from a particular node. As the algorithm traverses a graph, these indices are updated to identify roots of strongly connected components. A stack is used to cache the nodes that are potentially a set of strongly connected components that has not been fully identified. Once a strongly connected component root is identified, all the nodes within the same strongly connected component are readily discovered and they continuously occupy the top of the stack.

The graph traversal system modifies an implementation of Tarjan's algorithm in how to initialize one of a node's two indices. This change avoids identifying a single node by itself as a naïve strongly connected component. Instead of initializing a node's LowLink to the same value as its Index, the system initializes the LowLink to infinity or a very large number that will be higher than the highest index value. In this way, the system can test the value of the LowLink to differentiate a node that did not lead to any other nodes from a node that is a strongly connected component by itself (e.g., self-cycling).

The graph traversal system also adds logic to an implementation of Tarjan's algorithm to identify strongly connect component exits and entries. One property of Tarjan's algorithm is that the nodes of a strongly connected component are popped from the stack together. When the depth-first search finishes visiting an edge, the source node is on the stack, and the visiting of the destination node has finished. Because of this particular property, if the destination node is not on the stack at this point of time, the two nodes cannot be in the same strongly connected component. Thus, if the destination node belongs to a strongly connected component, then the destination node is an entry and the source node is an exit. The edge is an entry (or exit) edge in the point of view of the destination (or source) node's strongly connected component, if applicable.

In some embodiments, the graph traversal system is part of a recursion detection component of a compiler, such as the MICROSOFT™ Visual C++ Compiler, but the system can be used with any graph-based data structures to identify strongly connect components with entries and exits. In the compiler, the system helps to produce consistent code generation as software code changes. The compiler uses the system to determine a node in each strongly connected component that has the most entries, and uses the determined node as the starting point for determining which edges are recursive edges (i.e., those edges within the strongly connected component that lead back to the determined node). Recursive edges may indicate function calls that the compiler will not inline or may produce other code generation differences.

The node with the most entries is likely to stay consistent over time even as other portions of the graph change. Where each node represents a function in software code, nodes having many entries are functions that are heavily used and thus called frequently. Changing the node that has the most entries would mean that either another function becomes more frequently referenced by other functions or the original function is removed from frequent use. Since these are more rare events than adding a single call within a function to another function, the determination of recursive edges remains fairly consistent, and binary code is generated in a more consistent fashion as the software code changes over time.

FIG. 1 is a block diagram that illustrates components of the graph traversal system, in one embodiment. The system 100 includes a graph store 110, an initialization component 120, a graph search component 130, an SCC identification component 140, an entry/exit identification component 150, an entry count component 160, a reporting component 170, and a recursion detection component 180. Each of these components is described in further detail herein.

The graph store 110 is a data store that stores information about one or more graphs, such as the nodes, edges, and strongly connected component information determined by the system. The graph store 110 may include one or more files, hard drives, in-memory data structures, databases, cloud-based storage services, or any other storage facility for persisting graph data.

The initialization component 120 initializes one or more variables and prepares to identify strongly connected components, entries, and exits within a selected graph data structure. For example, the initialization component 120 may identify a graph to process, initialize a global node index/count to be used for numbering each node as it is encountered in a search, and create a stack for storing nodes that may be strongly connected. The initialization component 120 may invoke the graph search component to start a recursive depth-first search on the selected graph.

The graph search component 130 performs a search of the selected graph data structure to identify strongly connected components, entries, and exits. Each graph stored in the graph store 110 may identify a root node from which the graph search component 130 begins a depth-first search to traverse the entire graph. The graph search component 130 may use any search techniques that provide efficient processing of the graph and identification of the strongly connected components, entries, and exits. In some embodiments, the graph search component 130 uses recursive software code to search the selected graph data structure, and starts by invoking the recursive software code with the identified root node.

The SCC identification component 140 identifies strongly connected components within a given sub-graph of the selected graph data structure. The component 140 receives a potential root node, sets a node index based on the initialized global index, initializes a LowLink to a high number to indicate no connections have yet been encountered, and begins a recursive search of the node's descendants. After processing the node's descendants, the component 140 determines whether the potential root node is at the root of a strongly connected component sub-graph by testing whether the index value is equal to the LowLink value, indicating that no lower indexed node can be reached from the present node. If the two indices are equal, then the node is a root node of a strongly connected component sub-graph, and nodes are popped from the stack until the present node is popped off.

The entry/exit identification component 150 identifies entries and exits between strongly connected components during a pass that identifies the strongly connected components. During processing of a node's descendants as just described, if a node's descendant is not on the stack, then that descendant is an entry into a strongly connected component sub-graph if the descendant is in a strongly connected component sub-graph and the parent is an exit. The component 150 marks the nodes with this information so that it can be used later, such as by setting a variable of a node data structure to indicate whether the node is an entry/exit. The component 150 may also store entries and exits in a separate data structure for tracking entries and exits (e.g., a separate list), so that entries and exits can be easily traversed later.

The entry count component 160 maintains a count of entries into a particular node identified as an entry in the selected graph. Other software code may use the system 100 to identify a node within each set of strongly connected components that is the node with the most entries. For example, in the compiler example given herein, the node with the most entries may be used as a starting node in each strongly connected component sub-graph for recursion detection. The entry count component 160 updates a count of entries for a node each time a new node is identified during the search pass described herein. At the end of the search, the node with the most entries can be identified by inspecting the final value of the count for each node.

The reporting component 170 provides results of the search and identifies the strongly connected components, entries, and exits. The reporting component 170 may display a report or provide programmatic access to results to other software components that can use the information derived from the search to accomplish various tasks. The reporting component 170 may provide an application-programming interface (API) that software components can invoke to search a graph and identify strongly connected components, entries, and/or exits of a selected graph data structure.

The recursion detection component 180 identifies a node in each set of identified strongly connected components that has a highest number of entries from other sets of strongly connected components, and uses the identified node to detect recursive edges in the selected graph data structure. Recursive edges are those edges that lead back to a starting node. Compilers and other software tools may use information about recursive edges to perform a variety of tasks, such as generating correct binary code from a call graph of a software program.

The computing device on which the graph traversal system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
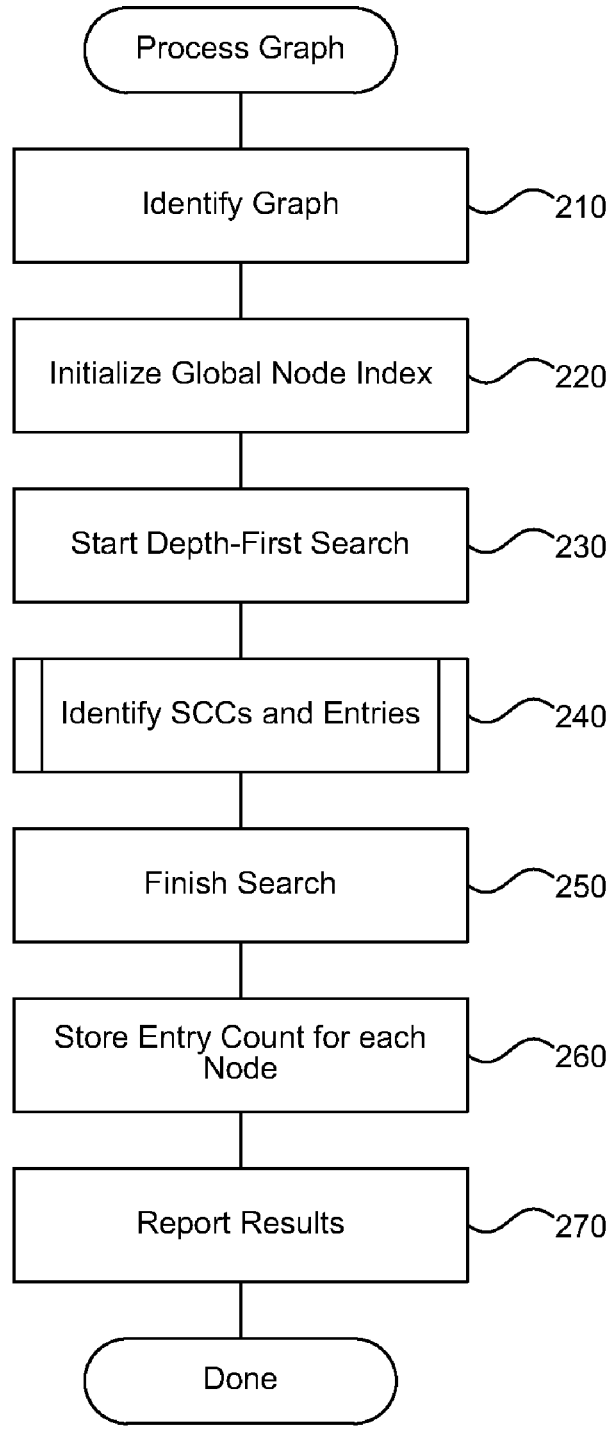
FIG. 2 is a flow diagram that illustrates processing of the graph traversal system to process a graph and report entries and exits, in one embodiment.

FIG. 2 is a flow diagram that illustrates processing of the graph traversal system to process a graph and report entries and exits, in one embodiment. Beginning in block 210, the system identifies a graph data structure to search for strongly connected components and entries and exits between strongly connected components, wherein the identified graph includes at least one node, and one or more edges that directionally connect nodes together. For example, the system may receive a graph from another software component that invokes the system. The graph may represent a call graph of functions in a software program or other data. Continuing in block 220, the system initializes a global node index that tracks a count of nodes identified during a traversal of the graph data structure. For example, the system may initialize a global variable to zero (or one for one-based counting), and increment the variable each time a node is encountered during traversal. Each node is initialized with the value of the global node index at the time the node was encountered.

Continuing in block 230, the system starts a depth-first search of the identified graph data structure, traversing each node in turn to determine whether each node is a root node of strongly connected components in the identified graph data structure. Continuing in block 240, the system identifies any strongly connected components, entries, and exits within the identified graph data structure and stores information describing the identified strongly connected components, entries, and exits. For example, the system may store metadata with each node and/or edge that indicates whether the node is a root node of strongly connected components, an entry, and/or an exit. A node can be any or all of these at the same time. An entry identifies a node for which an edge spans from one set of strongly connected components to another set of strongly connected components. An exit is simply the node at the source side of an edge from an entry. The system identifies entries and exits within the same search that identifies strongly connected components, without traversing the graph a second time. This improves efficiency of processing the graph, and can significantly reduce time for large graphs. This process is described further with reference to FIG. 3.

Continuing in block 250, the system completes the search of the identified graph data structure, and stores information describing results of the search. For example, the system may store a count of nodes identified, which nodes where entries/exits, which nodes are strongly connected components, and so forth. Continuing in block 260, the system stores an entry count for at least each node identified as an entry node. Other software components can use the system to determine a node in each strongly connected component sub-graph that has the most entries. For graphs that represent a call graph, the node with the most entries is often a node that will remain fairly consistent over time. Continuing in block 270, the system reports the results of the search to one or more software components for further processing. For example, the system may provide the results to a recursion detection component in a compiler or other component that uses a graph data structure. After block 270, these steps conclude.

Figure 3:
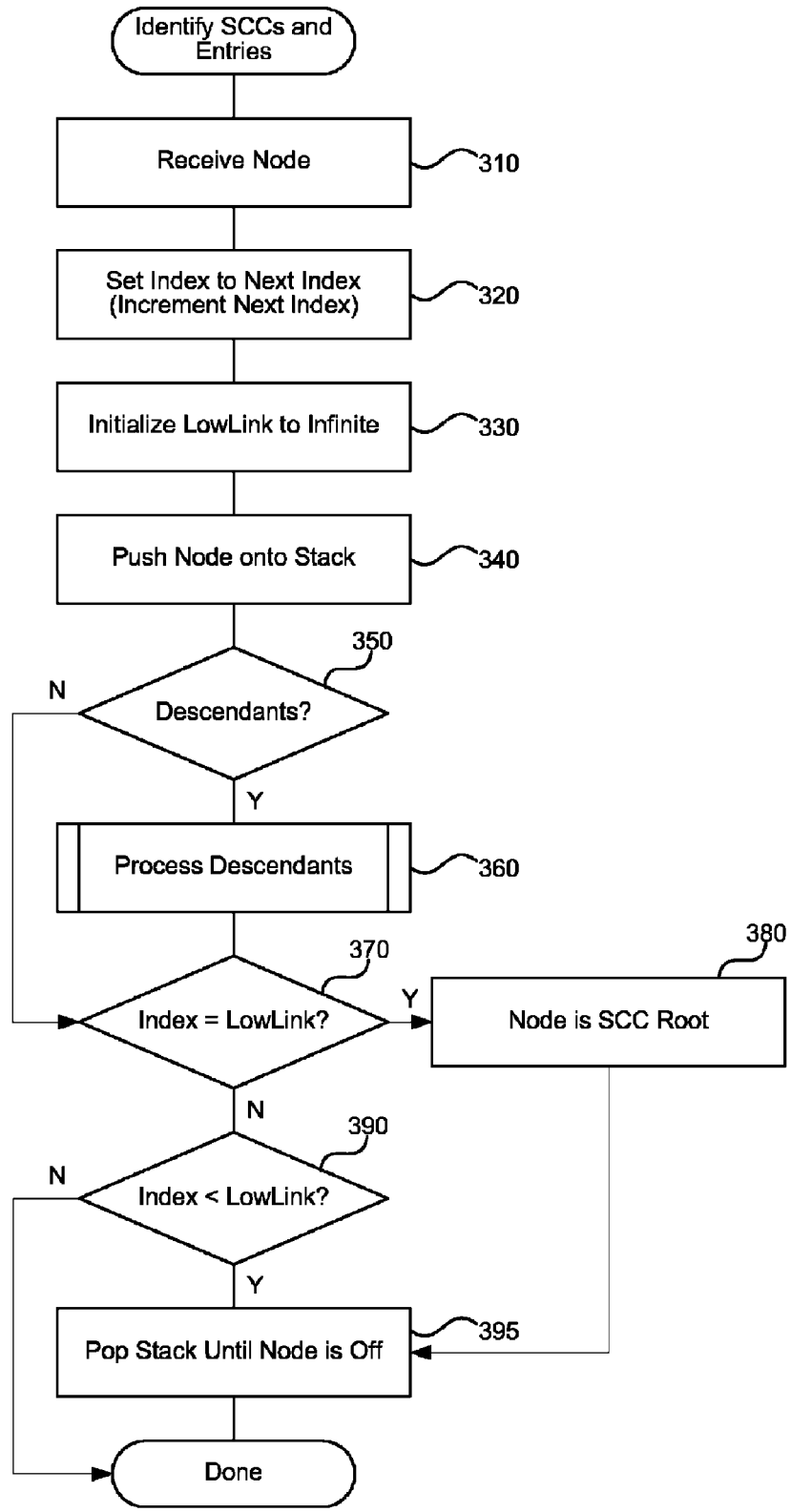
FIG. 3 is a flow diagram that illustrates processing of the graph traversal system to identify SCCs and entries/exits in the same pass, in one embodiment.

FIG. 3 is a flow diagram that illustrates processing of the graph traversal system to identify SCCs and entries/exits in the same pass, in one embodiment. Beginning in block 310, the system receives a node of a graph data structure for which to identify strongly connected components, entries, and exits. For example, these blocks may reside within a recursive function that traverses the graph data structure. Continuing in block 320, the system sets an index of the node to an incremented index that tracks a count of nodes identified in the graph data structure as the nodes are encountered. For example, the system may use a global variable shared across calls to the recursive function that the function increments each time a new node is assigned an index.

Continuing in block 330, the system initializes a low link value of the node to a number higher than a number of nodes in the graph data structure, wherein the low link value tracks a lowest index of other nodes that can be reached by following edges connected to the node. For example, the system may set the low link value to infinity or a maximum value allowed for the data type that stores the value (e.g., MAX_DWORD, 0xFFFFFFFF, or −1). The low link value is updated during traversal of the graph data structure and used to determine if a node is a root node of a set of strongly connected components.

Continuing in block 340, the system stores the node along with any other nodes that may be part of a set of strongly connected components in a temporary storage facility. For example, the system may push the node onto a stack that is updated during traversal of the graph data structure with nodes that may be part of the same set of strongly connected components. Upon identifying a node as a root of a set of strongly connected components, any nodes on the stack above that node are part of the same set of strongly connected components and can be removed together.

Continuing in decision block 350, if the node has descendants, then the system continues at block 360, else the system jumps to block 370. Continuing in block 360, the system processes descendants of the received node to determine whether each descendant is itself a root of a set of strongly connected components. For example, the system may recursively invoke a function for traversing the graph data structure with each descendant node, as described further with reference to FIG. 4.

Continuing in decision block 370, if the node index is equal to the node low link value, then the system continues at block 380, else the system continues at block 390. A node index equal to its low link value indicates that no lower indexed node can be reached from the current node, and thus the current node is the root of a set of strongly connected components. The strongly connected components at that time are included on the stack or other storage facility that stores the nodes that may be part of the same set of strongly connected components. Continuing in block 380, the system identifies the node as a root of a set of strongly connected components if the node index is equal to the node low link value. The system may set a variable on the node or store other metadata that indicates that the node is the root. After block 380, the system jumps to block 395.

Continuing in decision block 390, if the node index is less than the node low link value, then the system continues at block 395, else the system completes. Because the low link value is initialized to a number higher than all node indexes, if the index is still less than the low link value after the processing above, then the node does not lead to any other nodes (not even itself), and is thus an isolated node. Traditional definitions of strongly connected components identify such nodes as strongly connected components. However, processing for such nodes differs from those strongly connected components that do connect to other nodes or that self-cycle, and thus the system may identify these nodes differently. For example, the system may not identify isolated nodes as strongly connected components.

Continuing in block 395, the system removes nodes that were previously stored in the temporary storage facility until the received node is removed, wherein the removed nodes are a set of strongly connected components. For example, the system may pop nodes off the stack until the root node is popped off the stack. After block 395, these steps conclude.

Figure 4:
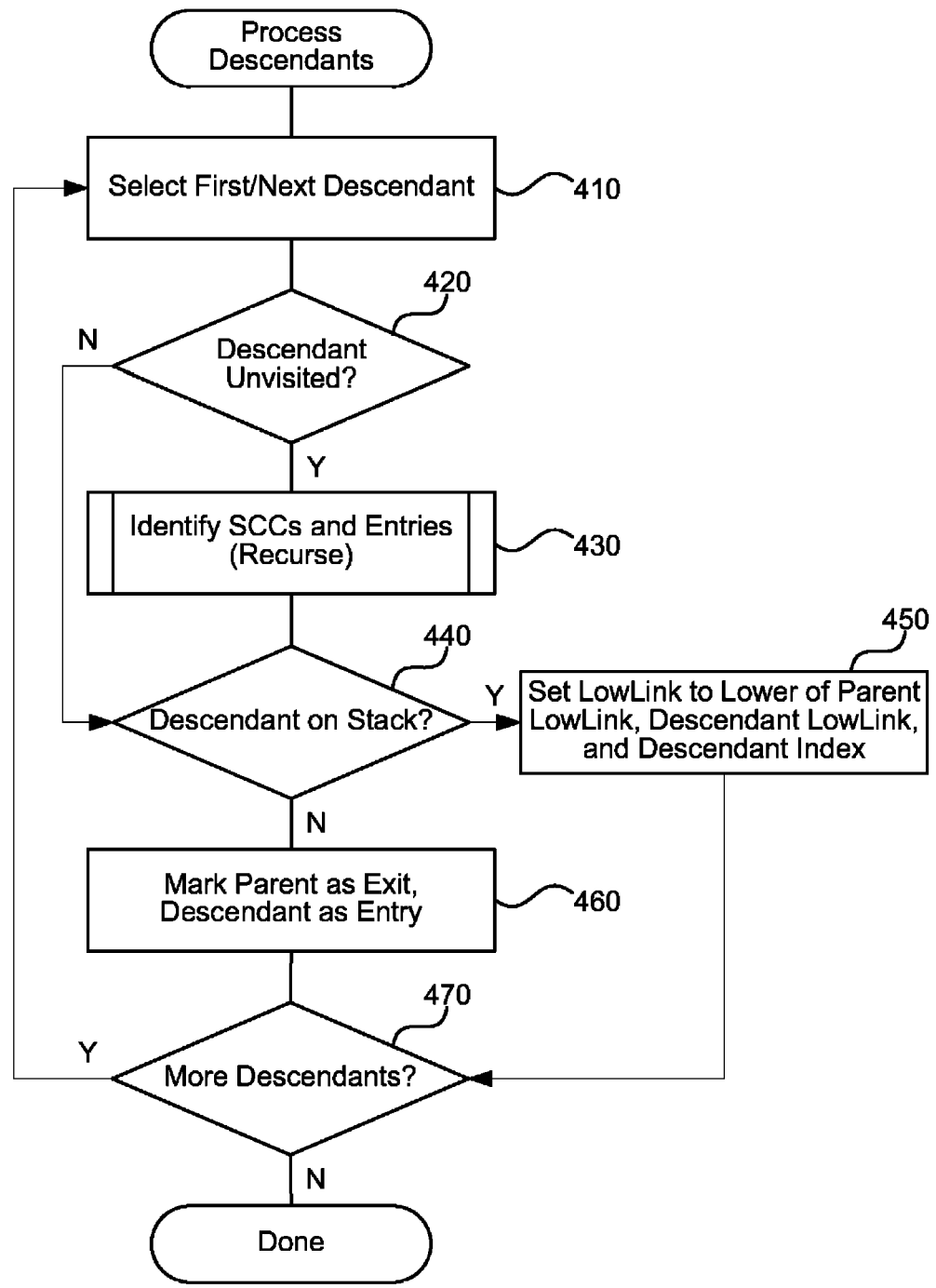
FIG. 4 is a flow diagram that illustrates processing of the graph traversal system to process descendants of a node, in one embodiment.

FIG. 4 is a flow diagram that illustrates processing of the graph traversal system to process descendants of a node, in one embodiment. Beginning in block 410, the system selects a first descendant node of a parent node, wherein the nodes are part of a graph data structure with one or more nodes and edges that connect the nodes. In some cases, such as where an edge is self-cycling, the first descendant node and parent node may be the same node.

Continuing in decision block 420, if the descendant has not previously been visited during the search, then the system continues at block 430, else the system jumps to block 440. Each descendant is visited as part of a depth-first search described further with reference to FIGS. 2 and 3. Revisiting of a descendant node may indicate a cycle of edges that leads to the descendant. Continuing in block 430, the system identifies strongly connected components, entries, and exits associated with the selected descendant node. For example, the system may invoke a recursive function passing the selected descendant node as the current root node to recursively identify strongly connected components, entries, and exits.

Continuing in decision block 440, if the descendant node is on the stack, then the system continues at block 450, else the system continues at block 460. A descendant node that is not on the stack indicates that a set of strongly connected components was previously identified that includes the descendant node or that the descendant node is an isolated node. Thus, edges between the parent node and selected descendant node pass from an exit to an entry between strongly connected components. Continuing in block 450, the system sets a low link value that tracks the lowest index of nodes reachable from the selected descendant node to the lower of a parent node's low link value, the selected descendant's low link value, and the descendant's index. A parent with a lower low link value indicates that the node is part of a set of strongly connected components, but is not the root (the parent or higher node is the root). After block 450, the system jumps to block 470.

Continuing in block 460, the system marks a parent node of the selected descendant node as an exit node and the descendant node as an entry node. Descendant nodes that are not on the stack with their parents at this point in the processing are part of a separate set of strongly connected components or isolated nodes, thus the connection between them is an entry/exit path. Continuing in decision block 470, if there are more descendants, then the system loops to block 410 to select the next descendant, else the system completes. After block 470, these steps conclude. After the processing of FIGS. 2, 3, and 4, other components can view results indicating each set of strongly connected components, which nodes are entries, which nodes are exits, and a node within each set of strong connected components that has the most entries (or exits, depending on the purpose).

In some embodiments, the graph traversal system does not identify lone nodes that are not self-cycling as strongly connected components. Traditional definitions of strongly connected components include those nodes that are leaf nodes without any edges as strongly connected components. These nodes are often of less or different interest to software components that use the system to identify strongly connected components or entries and exits. By setting the low link value above to a number higher than all node indexes and resetting the value to an index value in block 450 of FIG. 4, the system can distinguish isolated nodes from self-cycling single nodes or other nodes that are part of a multi-node group of strongly connected components. This can be done during traversal of the graph adding only a small amount of processing time and without adding additional orders of time complexity.

In some embodiments, the graph traversal system modifies other algorithms for identifying strongly connected components to also identify entries and exits. Although modifications to Tarjan's Algorithm are described herein, other algorithms for finding strongly connected components (e.g., Gabow's or Kosaraju's Algorithms) can be used with the system to identify entries and exits while strongly connected components are identified and without adding additional orders of time complexity.

In some embodiments, the graph traversal system performs a depth-first search within each identified set of strongly connected components to identify recursive edges. Recursive edges are those edges that return to a chosen starting node. Because identification of recursive edges is dependent on which node is chosen as the starting node, the system may select a node using characteristics less likely to change over time. For example, the system may select as the starting node, a node in a particular set of strongly connected components having a highest number of entries from other strongly connected components. In a call graph, such a node represents a frequently called function that is not likely to change over time.

From the foregoing, it will be appreciated that specific embodiments of the graph traversal system have been described herein for purposes of illustration, but that various modifications may be made without deviating from the spirit and scope of the invention. Accordingly, the invention is not limited except as by the appended claims.

We claim:

1. A computer-implemented method for identifying entries and exits while identifying strongly connected components in a graph, the method comprising:
    receiving a node of a graph data structure for which to identify strongly connected components, entries, and exits;
    setting an index of the received node to an incremented value that tracks a count of nodes identified in the graph data structure as the nodes are encountered;
    initializing a low link value of the received node to a number higher than a number of nodes in the graph data structure, wherein the low link value tracks a lowest index of other nodes that can be reached by following edges connected to the node;
    storing the received node along with any other nodes that may be part of a set of strongly connected components in a temporary storage facility;
    determining whether the received node has any descendants;
    upon determining that the received node has descendants, processing descendants of the received node to determine whether each descendant is itself a root of a set of strongly connected components; and
    if the node index is equal to the node low link value,
        identifying the node as a root of a set of strongly connected components; and
        removing nodes that were previously stored in the temporary storage facility until the received node is removed, wherein the removed nodes are a set of identified strongly connected components,
    wherein the preceding steps are performed by at least one processor.

2. The method of claim 1 wherein receiving the node comprises receiving the node as a parameter to a recursive software function for identifying strongly connected components, entries, and exits.

3. The method of claim 1 wherein setting the index of the received node comprises storing a current value of a global variable shared during traversal of nodes in the graph data structure and incrementing the value of the global variable.

4. The method of claim 1 wherein initializing the low link value comprises selecting a value that allows distinguishing an isolated node from nodes that are connected to other nodes.

5. The method of claim 1 wherein the low link value is updated during traversal of the graph data structure and tested to determine whether a node is a root node of a set of strongly connected components.

6. The method of claim 1 wherein storing the received node comprises pushing the received node onto a stack that is updated during traversal of the graph data structure with nodes that may be part of the same set of strongly connected components, and wherein removing nodes comprises popping nodes off of the stack until the root node is popped off of the stack.

7. The method of claim 1 wherein determining whether the received node has any descendants comprises identifying one or more edges having the received node as a source node.

8. The method of claim 1 wherein processing descendants comprises recursively invoking a software function for traversing the graph data structure with each descendant node in turn.

9. The method of claim 1 wherein identifying the node as the root of a set of strongly connected components comprises determining that no lower indexed node can be reached from the current node.

10. The method of claim 1 wherein identifying the node as the root of a set of strongly connected components comprises adding the node to a list of root nodes of strongly connected components.

11. The method of claim 1 further comprising, if the node index is less than the node low link value, removing the node from the temporary storage facility if the node is an isolated node with no edges so that the node is not identified as a strongly connected component.

* * * * *